United States Patent [19]

Yamamoto

[11] Patent Number: 5,546,155
[45] Date of Patent: Aug. 13, 1996

[54] DP BAG

[75] Inventor: Shohei Yamamoto, Tokyo, Japan

[73] Assignee: Fuji Photo Film Co., Ltd., Kanagawa, Japan

[21] Appl. No.: 380,574

[22] Filed: Jan. 30, 1995

[30] Foreign Application Priority Data

Feb. 23, 1994 [JP] Japan .................. 6-025200

[51] Int. Cl.⁶ .................................. G03B 13/10
[52] U.S. Cl. ................................. 354/354; 206/455
[58] Field of Search .................... 354/297, 340, 354/341, 354; 40/154, 159, 152, 359, 360; 283/36, 43; 206/455, 459, 232, 389; 281/31, 38, 40, 41, 36; 355/40, 50, 75, 41

[56] References Cited

U.S. PATENT DOCUMENTS

| | | | |
|---|---|---|---|
| 3,980,401 | 9/1976 | Holliday | 40/106.1 |
| 4,720,733 | 1/1988 | Ohtake et al. | 355/50 |
| 4,966,285 | 10/1990 | Otake et al. | 206/455 |
| 5,195,683 | 3/1993 | Gaetano | 229/72 |
| 5,251,746 | 10/1993 | Gresh | 206/232 |
| 5,251,747 | 10/1993 | Hansen et al. | 206/232 |
| 5,259,504 | 11/1993 | Manico | 206/455 |
| 5,271,497 | 12/1993 | Blackman et al. | 206/232 |
| 5,359,387 | 10/1994 | Hicks | 355/40 |
| 5,431,449 | 7/1995 | Arimoto et al. | 281/31 |
| 5,436,694 | 7/1995 | Ishikawa | 355/75 |

FOREIGN PATENT DOCUMENTS 3175448  7/1991  Japan .................. G03D 13/00

*Primary Examiner*—Della Rutledge
*Attorney, Agent, or Firm*—Sughrue, Mion, Zinn, Macpeak & Seas

[57] ABSTRACT

A DP bag having a bag main body which accommodates a developed film and an image display member onto which all of the images of the developed film are recorded together with image specifying marks. Because the images recorded onto the film can be easily viewed at a glance by simply looking at the image display member of the DP bag, it is easier to request prints from the film. Further, because the number of structural members of the DP bag is less than a case in which prints, onto which the contents of the photographs are printed, and the DP bag are provided separately, the DP bag is more resource saving.

42 Claims, 8 Drawing Sheets

DP BAG

BACKGROUND OF THE INVENTION

1. Field of the Invention

The present invention relates to a DP bag which a printing shop uses to return a developed film and prints to a customer.

2. Description of the Related Art

Conventionally, when a printing shop is requested by a customer to develop a film and, at the same time, make prints thereon, the developed film and prints are returned to the customer in a DP bag. Specifically, the developed film is cut every six frames and accommodated within a translucent negative bag. The negative bag is further accommodated within a paper bag.

It has been taught that the developed film can be accommodated within a cartridge at a processing laboratory. The cartridge (and the prints) are then returned to the customer (Japanese Patent Application Laid-Open No. 3-175448).

However, when the customer requests prints from a film, it is troublesome for him/her to withdraw the film which is taken up onto the cartridge. In addition, if the customer does not handle the film carefully, he/she may scratch or sully the images of the film.

SUMMARY OF THE INVENTION

With the aforementioned in view, an object of the present invention is to provide a DP bag which is formed by the minimum number of members necessary for the formation thereof and in which it is easier to request extra prints from the film in a case in which the developed film is accommodated within the cartridge and the cartridge is returned to the customer. Another object of the present invention is to provide a DP bag in which there is no possibility of damaging the image quality of the film due to the withdrawal of the film from the cartridge.

A DP bag according to a first aspect of the present invention comprises a DP bag main body which accommodates a developed film and an image display member onto which all of the images of the developed film are recorded together with image specifying marks.

In a DP bag according to the second aspect of the present invention, the image display member is integrally provided with the DP bag main body and is formed by image recording paper.

In a DP bag according to the third aspect of the present invention, a print request form which has columns for requesting prints, is provided the columns being capable of corresponding to the respective images of the developed film.

In accordance with the DP bag described in the first aspect of the present invention, all of the images of the developed film are recorded onto the image display member together with the image specifying marks (e.g., frame numbers). Accordingly, even if the developed film is taken up onto the cartridge and the cartridge, within which the developed film is accommodated, is returned to the customer in the DP bag main body, he/she can easily view the images recorded onto the film at a glance by looking at the image display member. Therefore, it is easier for the customer to request prints from the film. Alternatively, since there is no need to withdraw the film from the cartridge, the image quality of the film is not deteriorated. Moreover, the number of structural members of the DP bag of the present invention is minimized and therefore, the DP bag of the present invention results in a greater saving of resources than a case in which the prints, onto which the photographic contents are printed, and the DP bag are provided separately. Further, the size of the DP bag itself can be minimized.

The images can be recorded onto the image display member by a color printer, color copier, or the like. The DP bag can be formed of image recording paper, such as photographic printing paper, onto which the images of the film are recorded (i.e., printed).

Note that there are cases in which not all of the images are images which were properly photographed (for example, frames without images when pictures are taken with a lens cap on), and cases in which some of the images were not photographed, In accordance with the DP bag described in the second aspect of the present invention, the image display member is formed by the image recording paper, such as photographic printing paper, and all of the images of the developed film are recorded onto the image recording paper. Accordingly, non-image portions of the DP bag can be formed on plain paper.

In accordance with the DP bag described in the third aspect of the present invention, because the print request form provided on the DP bag has columns for requesting prints, the columns being capable of corresponding to the respective images, it is easier for the customer to request prints. Further, providing the columns for requesting prints at portions which correspond to the images allows the customer to make fewer mistakes in distinguishing which images he/she wants and does not want.

DESCRIPTION OF THE PREFERRED EMBODIMENTS

A DP bag relating to a first embodiment of the present invention will be described in accordance with FIGS. 1 through 3.

Figure 1:
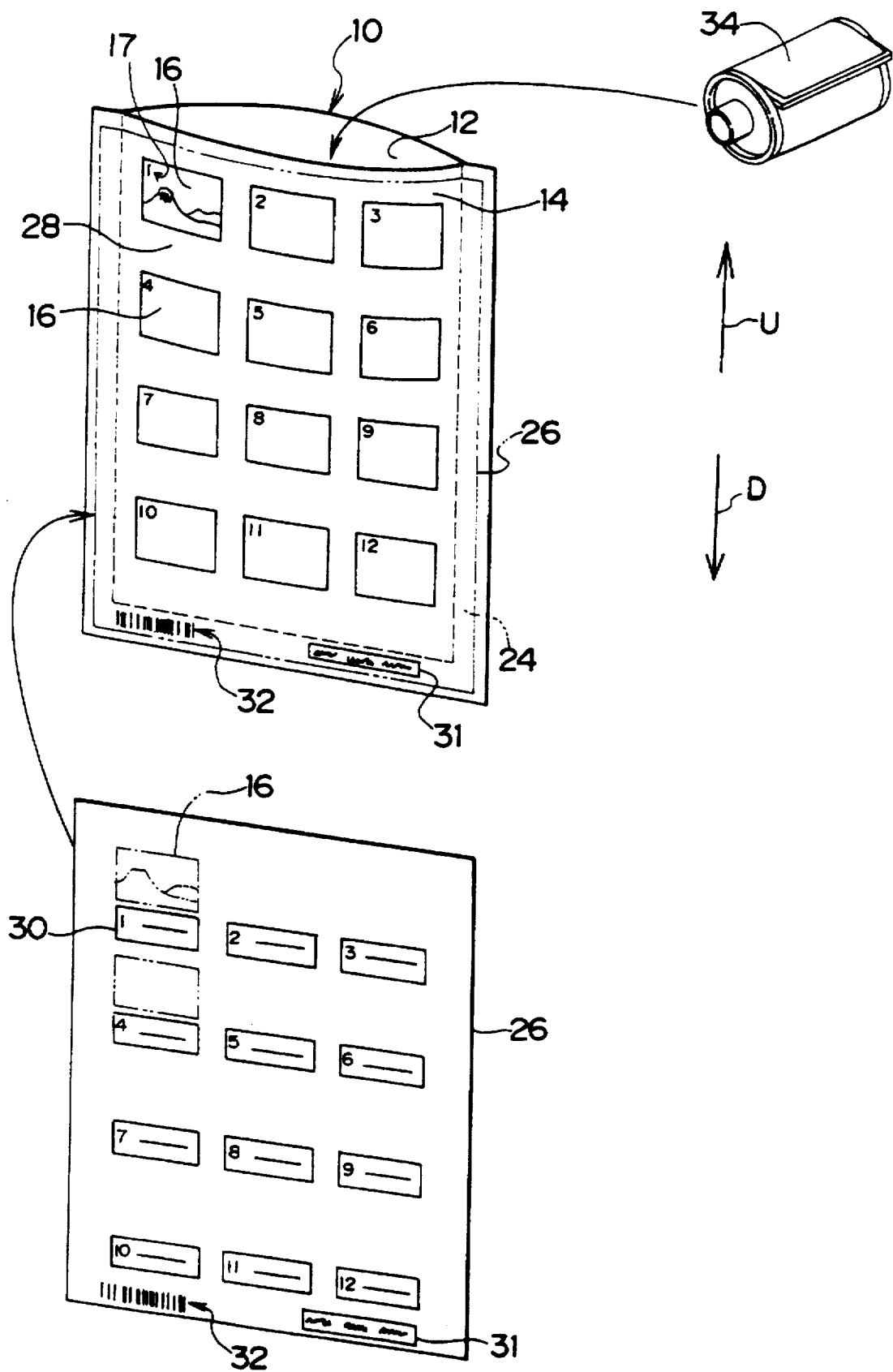
FIG. 1 is a perspective view of a back side of a DP bag relating to a first embodiment of the present invention.
Figure 2:
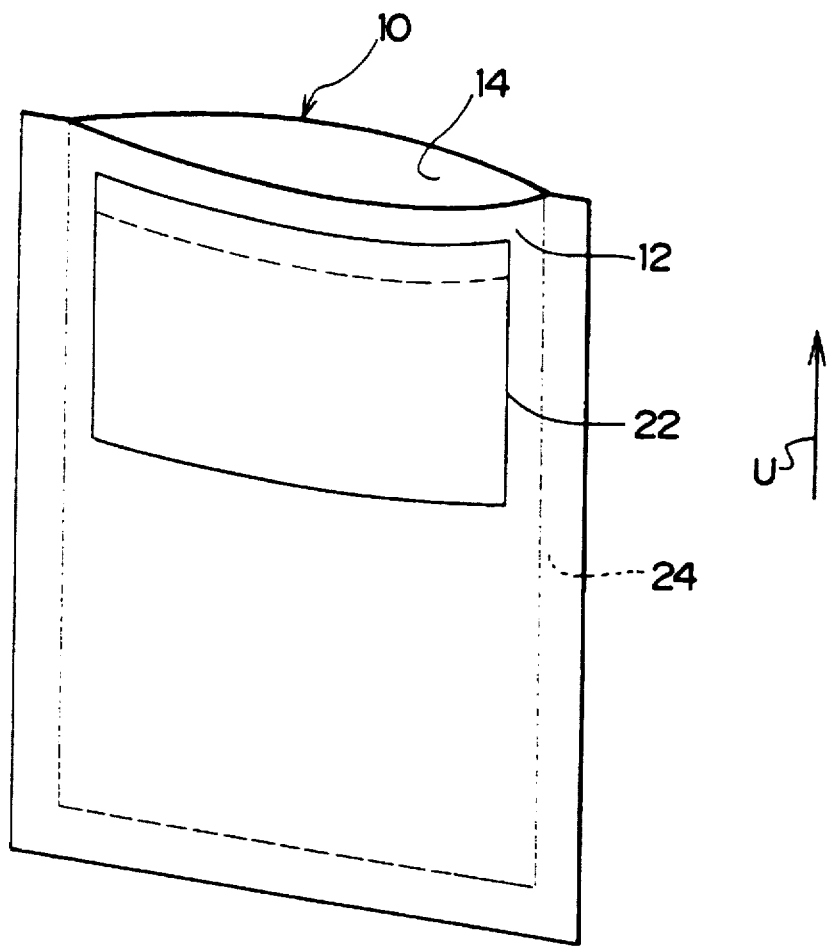
FIG. 2 is a perspective view of a front side of the DP bag illustrated in FIG. 1.

As shown in FIGS. 1 and 2, a DP bag 10 of the present embodiment is formed by a rectangular-shaped front paper 12 and a back paper 14 which serves as image recording paper. In the present embodiment, the dimensions (vertical and horizontal) of the front paper 12 and the back paper 14 are the same.

The back paper 14 which serves as the image recording member in the present invention is photographic printing paper. As shown in FIG. 1, a plurality of images 16 are arranged in a vertical-horizontal matrix on the outer surface (the surface which serves as photographic printing paper and to which photosensitive agent is applied) of the bag. The images 16 and image specifying marks (e.g., frame numbers) 17 are printed onto the outer surface of the bag. All of the images which are recorded onto a film (unillustrated) are printed on the back paper 14. The film is accommodated within a cartridge 34 and the cartridge 34 is returned to the customer in the DP bag 10.

On the other hand, the front paper 12 of the DP bag 10 is usually made of ordinary plain paper (synthetic paper made from synthetic resin or the like may be used). As illustrated in FIG. 2, a billing slip (i.e., an invoice) 22 is applied to the upper side (the side in the direction of arrow U) of the front paper 12. The contents (unillustrated) which correspond to the billing slip 22 are transferred and printed onto the front paper 12 when the billing slip 22 is filled in.

On the back surface of the front paper 12 and the back surface of the back paper 14, an overlap width 24 having a predetermined width (e.g., 5 mm) is provided at three edges of the respective back surfaces. An adhesive (specifically, a tackiness agent) is applied to the overlap width 24 of the front paper 12 and/or the back paper 14. The back surface of the front paper 12 and the back surface of the back paper 14 are pasted so as to form a bag-shape.

As shown in FIG. 1, a print request form 26, which substantially covers the overall configuration of the back paper 14, is disposed on the back paper 14 so as to be superposed thereon in the thickness direction thereof. The upper end of the print request form 26 adheres to the upper end of the back paper 14.

It is preferable that glue which is used to stick the print request form 26 onto the back paper 14 allows for a clean stripping off of the print request form 26 from the back paper 14 later on.

The print request form 26 is formed by a transparent or translucent synthetic resin sheet (or paper) (i.e., having a degree of transparency which allows the images 16 on the back paper 14 to be visually discernible). A frame 30 serving as a print request column, which corresponds to the respective images 16, is printed on the blank space 28 beneath the image 16.

Figure 3:
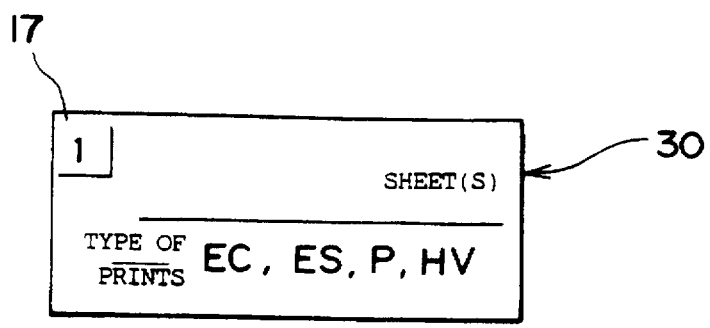
FIG. 3 is an enlarged view of a frame printed on a print request form.

As shown in FIG. 3, there is a frame number at the upper left corner portion of the frame 30. On the right side thereof, a blank space and markings are provided so as to indicate the number of prints ordered and the types of prints (e.g., EC (glossy surface, without borders), ES (silky surface, without borders), P (panorama), HV (high vision size), and the like).

Various types of information 31 such as the customer's name, the cartridge number, date, and the like, and a bar code 32 which includes the contents of these pieces of information are indicated at, for example, a blank space on the underside (the side in the direction of arrow D) of the back paper 14. Similarly, various types of information 31 and the bar code 32 are indicated on the print request form 26.

Next, the operation of the present embodiment will be explained.

With the DP bag 10 of the present embodiment, by looking at the back paper 14, all of the images recorded on the film (unillustrated) within the cartridge 34, which is accommodated within the DP bag 10 and returned to the customer, can be viewed at a glance together with the image specifying marks (e.g., frame number) 17. Consequently, there is no need to withdraw the film from the cartridge 34, and it is easier for the customer to search and verify the contents of the film when the customer requests extra prints from the film or the like.

Moreover, the back paper 14 (and the print request form 26) can be stripped from the front paper 12 so that only the back paper 14, onto which the images 16 are recorded, can be kept. A borderline region between the pasted portion of the back paper 14 and the non-pasted portion thereof may be perforated so that only the portion, onto which the images 16 are recorded, can be cut out along the perforations.

In the present embodiment, because the images are recorded on the DP bag 10, fewer materials are used for the DP bag 10 and the DP bag 10 is less expensive than the case in which the DP bag and the prints, onto which the images are recorded, are kept separate. The weight at the time of collection and delivery can thereby be reduced.

In the present embodiment, the images 16 are recorded on the back paper 14 only. However, the front paper 12 may be photographic printing paper so that the images 16 can also be recorded on the front paper 12. Accordingly, the DP bag 10 can also be used advantageously with films in which the number of frames to be photographed is large.

In the present embodiment, the back paper 14 is photographic printing paper and the images 16 are recorded thereon. However, the back paper 14 and the front paper 12 may be ordinary plain paper with the images 16 recorded thereon by a color copier, color printer, and the like.

Since the images 16 are printed onto the DP bag 10 together with the image specifying marks (e.g., frame numbers) 17, it is easy to reorder prints even if the print request form 26 has been lost or the like.

A second embodiment of the present invention will be described in accordance with FIGS. 4 and 5. Elements similar to those of the first embodiment are designated by the same reference numerals, and descriptions thereof are omitted.

With the DP bag 10 of the present embodiment, the back paper 14 is formed of ordinary plain paper as is the front paper 12.

Figure 4:
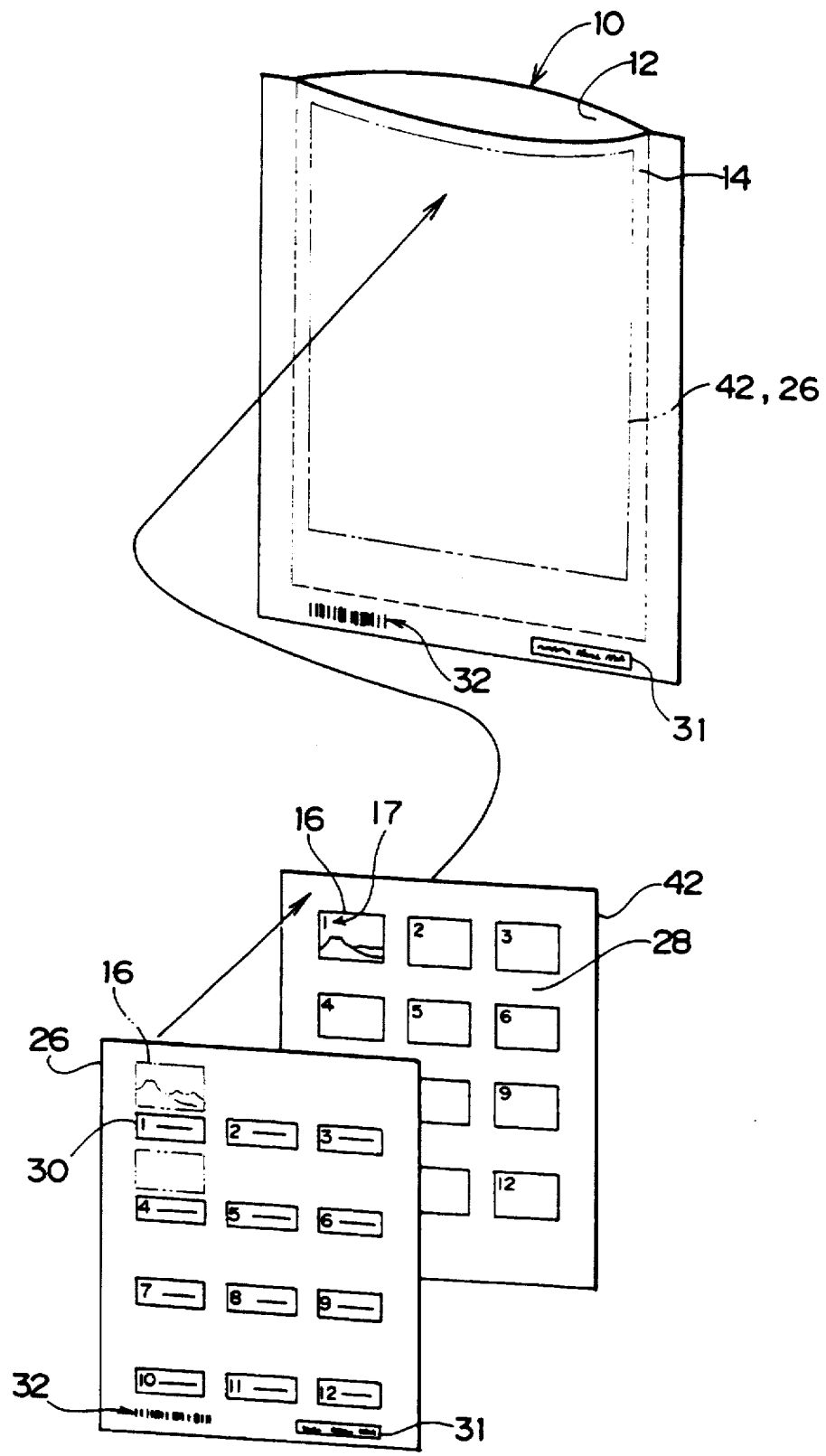
FIG. 4 is a perspective view of a back side of a DP bag relating to a second embodiment of the present invention.

As shown in FIG. 4, the upper portion of an index print 42, onto which the images 16 are recorded in a matrix, is adhered to the upper portion of the back paper 14. The print request form 26 having substantially the same size as the index print 42 is disposed at the index print 42 so as to be superposed thereon in the thickness direction thereof. The upper portion of the print request form 26 is adhered to the upper portion of the index print 42.

Figure 5:
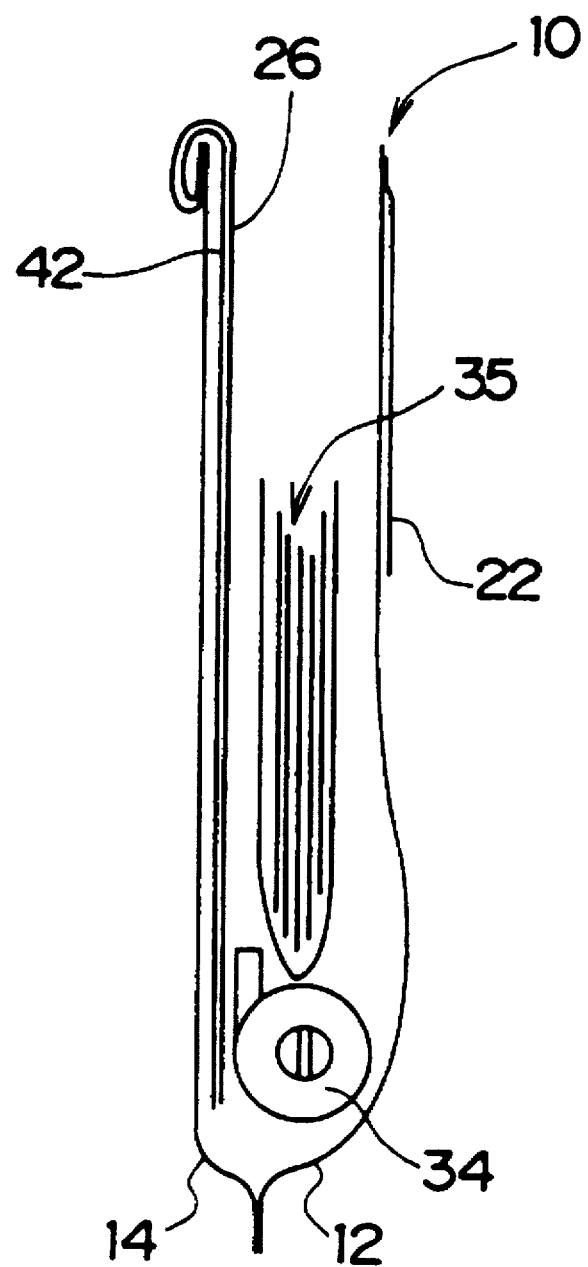
FIG. 5 is a vertical sectional view of the DP bag relating to the second embodiment of the present invention.

In the present embodiment, when the cartridge 34 and prints 35 are returned as shown in FIG. 5, the index print 42 and the print request form 25 can be folded back and accommodated within the DP bag 10. Accordingly, the index print 42 (i.e., the images 16) can be protected. In addition, the contents of the images 16 cannot be accidentally seen by others.

A third embodiment of the present invention will be described in accordance with FIGS. 6 and 7. The present embodiment is a variant example of the aforementioned second embodiment. Elements similar to those of the second embodiment are designated by the same reference numerals, and descriptions thereof are omitted.

Figure 6:
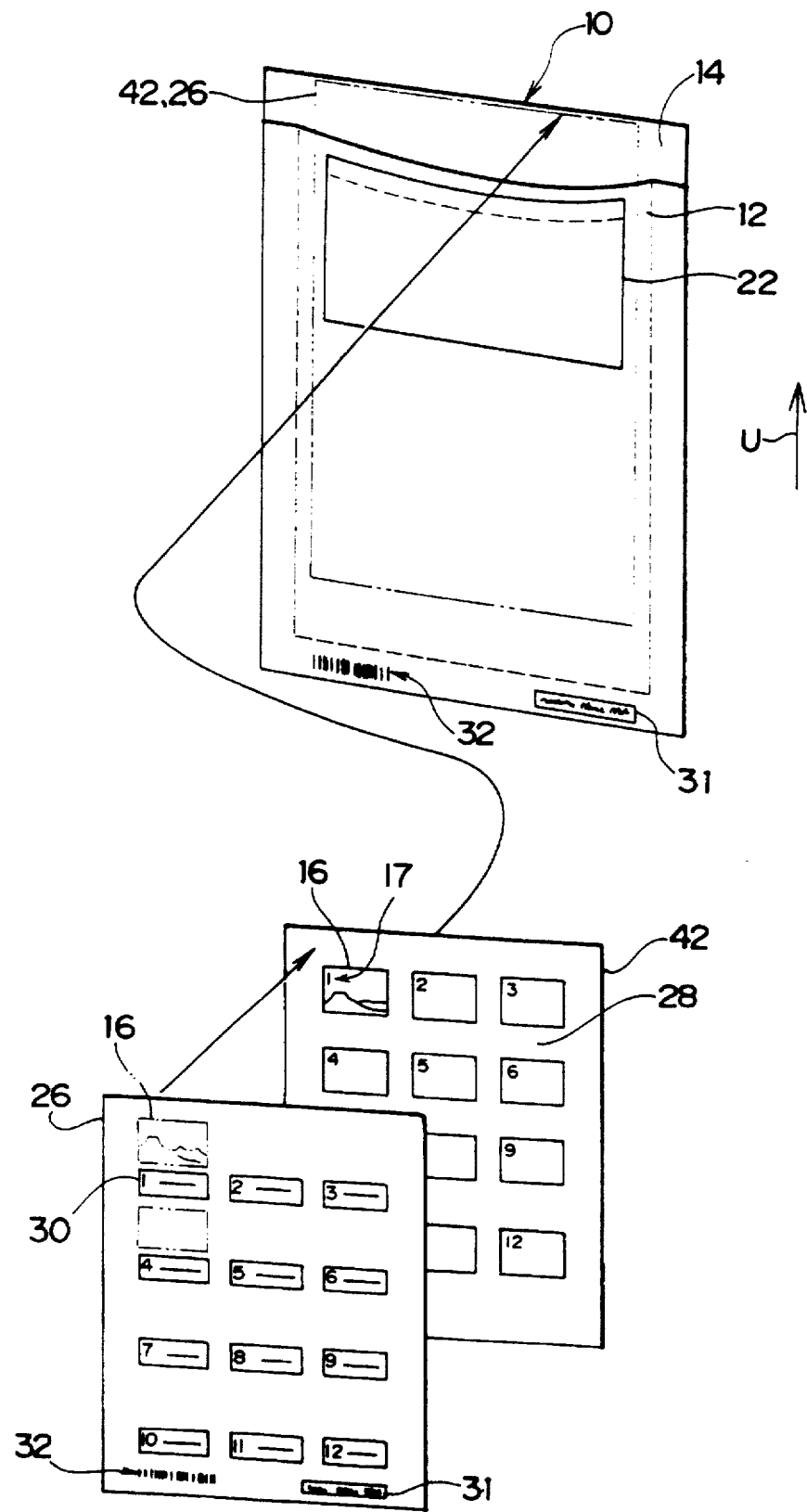
FIG. 6 is a perspective view of a front side of a DP bag relating to a third embodiment of the present invention.

As shown in FIG. 6, in the DP bag 10 of the present embodiment, the longitudinal dimension (the dimension in the direction of arrow U and in the direction opposite the direction of arrow U) of the back paper 14 is longer than the longitudinal dimension of the front paper 12. The upper portion of the back paper 14 protrudes further than the upper edge of the front paper 12 in the direction of arrow U. In the present embodiment, the upper portion of the index print 42 is adhered to the upper portion of the back paper 14 at the inner side surface of the bag.

Figure 7:
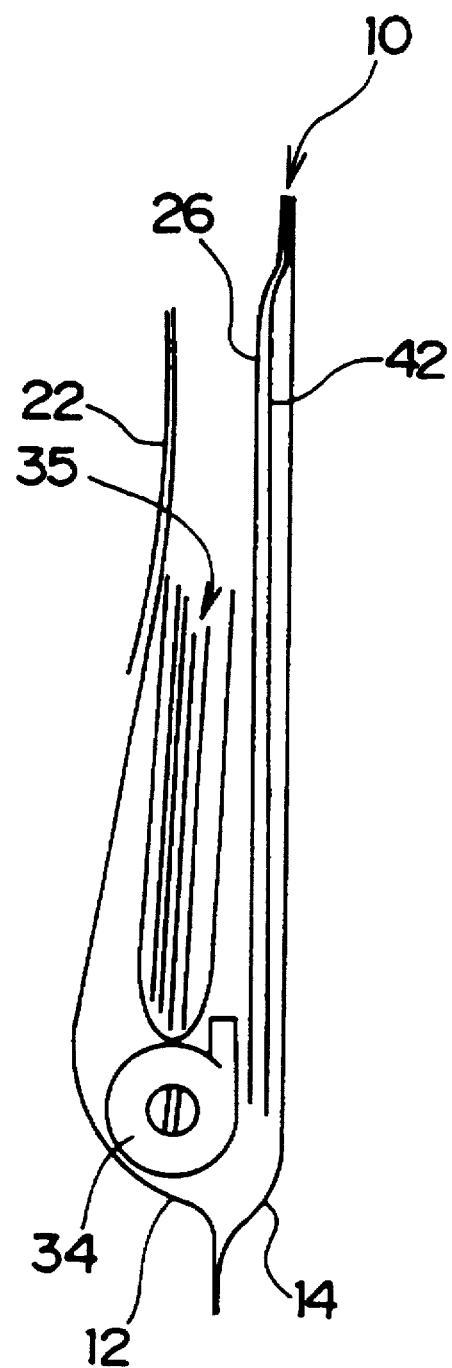
FIG. 7 is a vertical sectional view of the DP bag illustrated in FIG. 6.

In the present embodiment, as shown in FIG. 7, the index print 42 can be accommodated unfolded within the DP bag 10 so that the images 16 can be protected. In addition, the contents of the images 16 cannot be accidentally seen by others.

It is preferable that the glue which is used to stick the index print 42 to the back paper 14 allows for the stripping off of the index print 42 from the back paper 14 later. The index print 42 can be thereby stripped from the back paper 14 while the high quality of the index print 42 is maintained. A borderline region between the pasted portion of the back paper 14 and the non-pasted portion thereof may be perforated. The non-pasted portion is cut out from the perforations. The index print 42 is thereby removed from the DP bag 10.

A fourth embodiment of the present invention will be described in accordance with FIG. 8. The present embodiment is a variation of the aforementioned second embodiment. Elements similar to those of the second embodiment are designated by the same reference numerals, and descriptions thereof are omitted.

Figure 8:
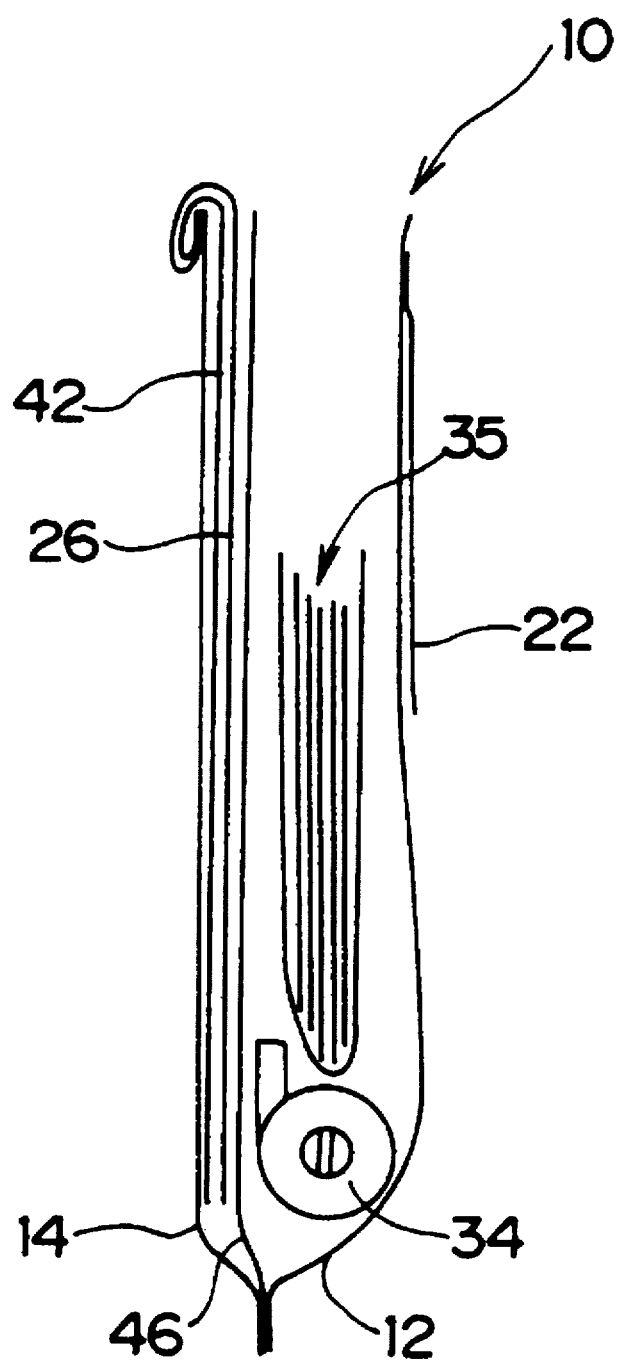
FIG. 8 is a vertical sectional view of a DP bag relating to a fourth embodiment of the present invention.

As shown in FIG. 8, the interior of the DP bag 10 of the present embodiment is devided by a protective sheet 46 into two chambers. The edge portion of the protective sheet 46 is adhered to the respective edge portions of the front paper 12 and the back paper 14.

As illustrated in FIG. 8, in the case of the DP bag 10 of the present embodiment, the index print 42 is accommodated within the DP bag 10 on the front paper 12 side with respect to the protective sheet 46, which serves as a partitioning member. The cartridge 34 is accommodated within the DP bag 10 at the back paper 14 side thereof with respect to the protective sheet 46. Consequently, the index print 42 and the cartridge 34 can be separated by the protective sheet 46. Therefore, the index print 42 can be protected from the cartridge 34.

The protective sheet 46 is made of paper, hard or soft synthetic resin sheet, sponge or the like. However, the protective sheet 46 may be a thin plate. In addition, the number of protective sheet 46 may be further increased and the interior of the DP bag 10 may be defined into more than two chambers.

Similar to the DP bag 10 of the second embodiment, the index print 42 can be folded back and accommodated within the DP bag 10 of the present embodiment. Accordingly, the content of the images 16 can not be accidentally seen by others.

Figure 9:
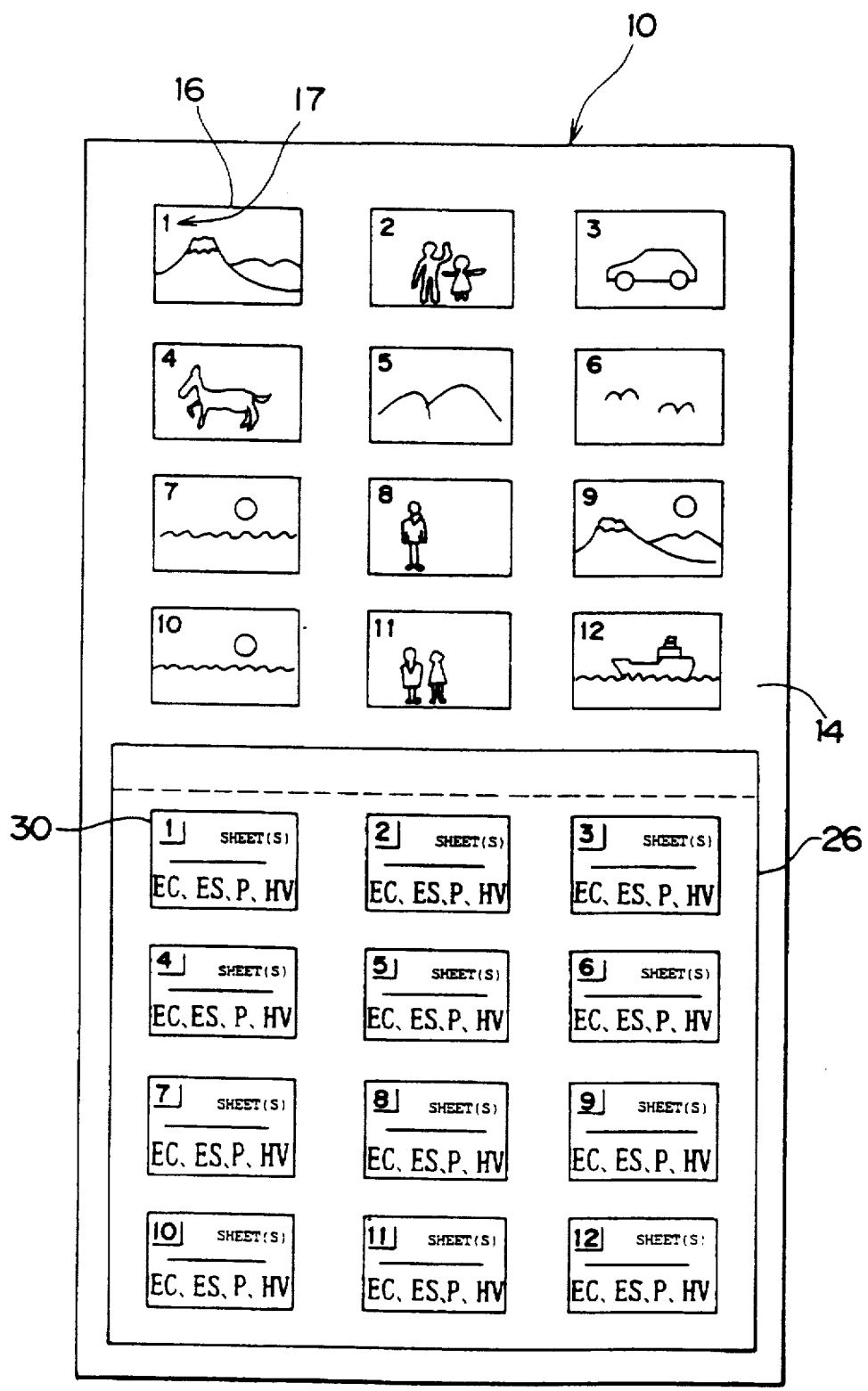
FIG. 9 is a plan view of a back side of a DP bag relating to another embodiment of the present invention.

In the above-described embodiments, when the print request form 26 is superposed on the images 16, which are recorded onto the back paper 14 or the index print 42, in the thickness direction of the back paper 14 or the index print 42, frames 30 used for requesting the images 16 are disposed in the vicinity of the images 16. However, it is also acceptable for the images 16 to correspond to the frames 30 for requesting the printing of the images 16. As illustrated in FIG. 9, the frames 30 may be arranged similar to the images 16, which are arranged in a matrix, and are printed on locations separate from the images 16.

As described above, with the DP bag described in the first aspect of the present invention, all of the images of the developed film are recorded onto the image display member together with the image specifying marks. Accordingly, the present invention achieves superior effects in that, even if the developed film is taken up onto the cartridge and the cartridge is returned to the customer in the DP bag main body, all of the images recorded onto the film can be easily viewed at a glance and it is easier to request prints from the film by simply looking at the image display member of the DP bag. Further, deterioration of the image quality of the film can be prevented since there is no need to withdraw the film from the cartridge. Moreover, the present invention achieves superior effects in that the number of structural members of the DP bag of the present invention is less and the DP bag of the present invention is more resource saving than when prints, onto which the contents of the photographs are printed, and the DP bag are provided separately. Accordingly, the size of the DP bag itself is minimized. In particular, it is easier to store the DP bags at and carry them to places such as a processing laboratory and a printing shop where a large number of DP bags is handled.

With the DP bag described in the second aspect of the present invention, an image display member is formed by image recording paper, for example, photographic printing paper, and images of the developed film are recorded onto the image recording paper. Accordingly, the present invention achieves superior effects in that non-image portions of the DP bag can be formed by plain paper and that costs thereof can be minimized.

Further, in the DP bag described in the third aspect of the present invention, since the print request form provided at the DP bag has columns for requesting prints, the columns corresponding to the respective images, the present invention achieves superior effects in that it is easier to request prints and the customer is allowed to make fewer mistakes in distinguishing which images he/she wants and does not want.

What is claimed is:

1. A DP bag comprising:
   a DP bag main body which accommodates a developed film, said main body comprising two paper sheets that are bonded together at edges thereof to form a bag; and
   wherein one of said paper sheets comprises an image display member onto which all of the images of the developed film are recorded together with image specifying marks.

2. A DP bag according to claim 1, wherein said image display member is formed by image recording paper.

3. A DP bag according to claim 2, further comprising:
   a print request form which has columns for requesting prints, said columns corresponding to the respective images of said developed film.

4. A DP bag according to claim 3, wherein said print request form is disposed on said image display member so as to be superposed on said image display member in the thickness direction of said image display member.

5. A DP bag according to claim 3, wherein said print request form is disposed in the vicinity of a position in which said image display member is provided.

6. A DP bag according to claim 2, wherein said image display member is photographic printing paper.

7. A DP bag according to claim 1, further comprising:
   a print request form which has columns for requesting prints, said columns corresponding to the respective images of said developed film.

8. A DP bag according to claim 7, wherein said print request form is disposed on said image display member so as to be superposed on said image display member in the thickness direction of said image display member.

9. A DP bag according to claim 7, wherein said print request form is disposed in the vicinity of a position in which said image display member is provided.

10. A DP bag according to claim 1, wherein said image display member is an index print onto which all of the images on the developed film are recorded in a matrix, and said index print is adhered to said DP bag main body.

11. A DP bag according to claim 1, further comprising:
a partitioning member which partitions an interior of said DP bag main body.

12. A DP bag comprising:
a DP bag main body which accommodates a developed film accommodated within a cartridge, said main body comprising two paper sheets that are bonded together at edges thereof to form a bag; and
wherein one of said paper sheets comprises an image display portion formed by image recording paper, all of the images on the developed film being recorded onto the image display portion together with image specifying marks.

13. A DP bag according to claim 12, further comprising:
a print request form which has columns for requesting prints, said columns being capable of corresponding to the respective images of said developed film.

14. A DP bag according to claim 13, wherein said print request form is disposed on a surface of said image display portion so as to be superposed on said image display portion.

15. A DP bag according to claim 14, wherein said print request form has a degree of transparency which allows the images on said image display portion to be visually through said print request form.

16. A DP bag according to claim 13, wherein said print request form is disposed in the vicinity of a position in which said image display portion is formed.

17. A DP bag comprising:
a DP bag main body which accommodates a developed film accommodated within a cartridge, said main body comprising two paper sheets that are bonded together at edges thereof to form a bag; and
wherein one of said paper sheets comprises an index print onto which all of the images on the developed film are recorded in a matrix.

18. A DP bag according to claim 17, further comprising:
a print request form which has columns for requesting prints, said columns being capable of corresponding to the respective images of said developed film.

19. A DP bag according to claim 18, wherein said print request form is disposed on said index print so as to be superposed on said index print in the thickness direction of said index print.

20. A DP bag according to claim 18, wherein said print request form is disposed in the vicinity of a position in which said index print is adhered.

21. A DP bag according to claim 17, wherein said index print is adhered to an outer side surface of said DP bag main body so that at least a portion of said index print can be accommodated within said DP bag main body.

22. A DP bag according to claim 21, further comprising:
a partitioning member which partitions an interior of said DP bag main body.

23. A DP bag according to claim 17, wherein said index print is adhered to an inner side surface of said DP bag main body so that at least a portion of said index print can be accommodated within said DP bag main body.

24. A DP bag according to claim 23, wherein said DP bag has a protruding portion at a portion of an open end portion of said DP bag main body, and said protruding portion forms an adhering portion to which said index print is adhered.

25. A DP bag comprising:
a DP bag main body which accommodates a developed film; and
an image display member onto which all of the images of the developed film are recorded together with image specifying marks, said image display member being integrally provided with said DP bag main body and is formed by image recording paper; and
a print request form which has columns for requesting prints, said columns being capable of corresponding to the respective images of said developed film.

26. A DP bag according to claim 25, wherein said print request form is disposed on said image display member so as to be superposed on said image display member in the thickness direction of said image display member.

27. A DP bag according to claim 25, wherein said print request form is disposed in the vicinity of a position in which said image display member is provided.

28. A DP bag comprising:
a DP bag main body which accommodates a developed film; and
an image display member onto which all of the images of the developed film are recorded together with image specifying marks, wherein said image display member is integrally provided with said DP bag main body and is formed of photographic printing paper.

29. A DP bag comprising:
a DP bag main body which accommodates a developed film;
an image display member onto which all of the images of the developed film are recorded together with image specifying marks; and
a print request form which has columns for requesting prints, said columns being capable of corresponding to the respective images of said developed film.

30. A DP bag according to claim 29, wherein said print request form is disposed on said image display member so as to be superposed on said image display member in the thickness direction of said image display member.

31. A DP bag according to claim 29, wherein said print request form is disposed in the vicinity of a position in which said image display member is provided.

32. A DP bag comprising:
a DP bag main body which accommodates a developed film accommodated within a cartridge;
an image display portion formed by image recording paper on at least a portion of said DP bag main body, all of the images on the developed film being recorded onto the image display portion together with image specifying marks; and
a print request form which has columns for requesting prints, said columns being capable of corresponding to the respective images of said developed film.

33. A DP bag according to claim 32, wherein said print request form is disposed on a surface of said image display portion so as to be superposed on said image display portion.

34. A DP bag according to claim 33, wherein said print request form has a degree of transparency which allows the images on said image display portion to be visually discernible.

35. A DP bag according to claim 32, wherein said print request form is disposed in the vicinity of a position in which said image display portion is formed.

36. A DP bag comprising:

a DP bag main body which accommodates a developed film accommodated within a cartridge;

an index print onto which all of the images on the developed film are recorded in a matrix, said index print being adhered to said DP bag main body; and a print request form which has columns for requesting prints, said columns being capable of corresponding to the respective images of said developed film.

37. A DP bag according to claim 36, wherein said print request form is disposed on said index print so as to be superposed on said index print in the thickness direction of said index print.

38. A DP bag according to claim 36, wherein said print request form is disposed in the vicinity of a position in which said index print is adhered.

39. A DP bag comprising:

a DP bag main body which accommodates a developed film accommodated within a cartridge; and an index print onto which all of the images on the developed film are recorded in a matrix, said index print being adhered to an outer side surface of said DP bag main body so that at least a portion of said index print can be accommodated within said DP bag main body.

40. A DP bag according to claim 39, further comprising:

a partitioning member which partitions an interior of said DP bag main body.

41. A DP bag comprising:

a DP bag main body which accommodates a developed film accommodated within a cartridge; and an index print onto which all of the images on the developed film are recorded in a matrix, said index print being adhered to an inner side surface of said DP bag main body so that at least a portion of said index print can be accommodated within said DP bag main body.

42. A DP bag according to claim 41, wherein said DP bag has a protruding portion at a portion of an open end portion of said DP bag main body, and said protruding portion forms an adhering portion to which said index print is adhered.

* * * * *